US008667589B1

(12) United States Patent
Saprygin et al.

(10) Patent No.: US 8,667,589 B1
(45) Date of Patent: Mar. 4, 2014

(54) PROTECTION AGAINST UNAUTHORIZED ACCESS TO AUTOMATED SYSTEM FOR CONTROL OF TECHNOLOGICAL PROCESSES

(71) Applicant: Konstantin Saprygin, Moscow (RU)

(72) Inventors: Konstantin Saprygin, Moscow (RU); Alexander Zuykov, Moscow (RU); Dmitry Mikhailov, Moscow (RU); Stanislav Fesenko, Moscow (RU)

(73) Assignee: Konstantin Saprygin, Moscow (RU)

( * ) Notice: Subject to any disclaimer, the term of this patent is extended or adjusted under 35 U.S.C. 154(b) by 0 days.

(21) Appl. No.: 14/064,152

(22) Filed: Oct. 27, 2013

(51) Int. Cl.
 *H04L 29/06* (2006.01)
(52) U.S. Cl.
 CPC ............ *H04L 63/0209* (2013.01); *H04L 63/02* (2013.01); *H04L 63/16* (2013.01)
 USPC ........................................................ 726/23
(58) Field of Classification Search
 CPC ...... H04L 63/0209; H04L 63/02; H04L 63/16
 USPC .......................................................... 726/23
 See application file for complete search history.

(56) References Cited

U.S. PATENT DOCUMENTS

| 8,176,532 | B1 * | 5/2012 | Cook ................................. 726/4 |
| 2005/0015624 | A1 * | 1/2005 | Ginter et al. .................. 713/201 |
| 2005/0144437 | A1 * | 6/2005 | Ransom et al. ............... 713/151 |
| 2006/0242706 | A1 * | 10/2006 | Ross ................................ 726/23 |
| 2007/0199061 | A1 * | 8/2007 | Byres et al. ...................... 726/11 |
| 2009/0254655 | A1 * | 10/2009 | Kidwell et al. ................ 709/224 |

\* cited by examiner

*Primary Examiner* — Michael S McNally
(74) *Attorney, Agent, or Firm* — Bardmesser Law Group (57) ABSTRACT

A protection system for an automate process control system (APCS) includes a plurality of programmable anti-intrusion (PAI) modules. The PAI modules are places throughout the APCS used for: analyzing a system for presence of un-authorized devices or un-authorized connections; detection of undocumented (i.e., not declared) devices and suspicious commands from connected devices; filtering various types of activities (i.e., wrong packets, unidentified activities, certain types of commands etc.); analyzing different network layers for un-authorized data transmissions; and maintaining device behavior (heuristic) logs.

16 Claims, 5 Drawing Sheets

PROTECTION AGAINST UNAUTHORIZED ACCESS TO AUTOMATED SYSTEM FOR CONTROL OF TECHNOLOGICAL PROCESSES

BACKGROUND OF THE INVENTION

1. Field of the Invention

The present invention relates to an automated process control system (APCS), and more particularly, to a system for protection of data transmission lines and devices of the APCS from an unauthorized access.

2. Description of the Related Art

Modern automated systems for controlling technological processes use equipment and data transmission lines that need to be protected from an unauthorized access. The unauthorized access can be used in order collect the transmitted data including operation parameters of the automated system components. The data can be blocked, or falsified by an intruder. Furthermore, the intruder can destroy system equipment and software by activating some hardware bugs in the equipment. The intruder can also send control commands or change configurations in order to change operational parameters of the system components and equipment.

An intruder can access the data transmission lines directly (by physical access to the lines or to the equipment) or by accessing the data transmission lines through indirect intrusion systems using hardware and software means. The remote access to the system equipment and components can be implemented from control computers, such as supervisory control and data acquisition (SCADA) systems. The remote access can also be implemented from the intermediate nodes located between the control computers and the field equipment. For example, programmable logical controllers, network equipment and I/O systems can be affected by an unauthorized access.

Additionally, the intruder can have a remote access from devices connected to the intermediate nodes and directly to the data transmission lines. Conventional firewalls and AV protection systems are only effective against known viruses and malware directed to the software modules. However, they provide no protection against intrusions and unauthorized access threats directed to different components of the complex automated process control system (APCS). In other words, the SCADA portion (i.e., the highest level) of the automated control system can be protected by the conventional AV means, but the lower levels of the system need some other means of protection against intrusions. Note that the conventional systems do not protect APCS data channels and logical controllers.

Accordingly, there is a need in the art for efficient and effective protection of the entire APCS against intrusions and unauthorized access threats.

SUMMARY OF THE INVENTION

Accordingly, the present invention is directed to a method and system for protection of automated process control system (APCS) against intrusions and unauthorized access that substantially obviates one or more of the disadvantages of the related art.

The protection system for the APCS includes a plurality of programmable anti-intrusion (PAI) modules. The PAI modules are used for: analyzing a system for presence of un-authorized devices or un-authorized connections; detection of undocumented (i.e., undeclared) devices and suspicious commands from connected devices; filtering various types of activities (i.e., wrong packets, unidentified activities, certain types of commands etc.); analyzing different network layers of the OSI stack for un-authorized data transmissions; and maintaining device behavior (including heuristic) logs.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS OF THE INVENTION

Reference will now be made in detail to the embodiments of the present invention, examples of which are illustrated in the accompanying drawings.

In one aspect, a protection system for the automated process control system (APCS) includes a plurality of programmable anti-intrusion (PAI) modules. The PAI modules are located at potential vulnerability points of the APCS, namely at levels below SCADA. The PAI modules are used for: analyzing a system for presence of un-authorized devices or un-authorized connections; detection of undocumented (i.e., undeclared) devices and suspicious commands from connected devices; filtering various types of activities (i.e., wrong packets, such as packets sent to nonexistent addresses, or containing erroneous checksums or parity bits, or packets that are a priori known to lead to malicious or destructive consequences, unidentified activities, such as prohibited commands, or commands prohibited at a current moment in time, or commands sent from an address or device that is not authorized to send such a command (ever or at a current moment), certain types of commands, such as commands to turn off the system, commands to program the logic controller, etc.); analyzing different network layers of the OSI stack for unauthorized data transmissions; and maintaining device behavior (including heuristic) logs.

The APCS can include separate automated process control systems (APCS) and automated devices aggregated into one system. The APCS can include SCADA systems, distributed control systems, programmable logic controllers, as well as smaller systems based on microcontrollers. The APCS has a single operation control system (or, in some cases, multiple control systems, which can be independent or one or more can be slaved to others for controlling the technological process in a form of one or several control centers. The APCS also includes data processing and archiving means for storing the technological process-related data. The APCS also includes sensor/gauges, control modules and executive modules. All of the sub systems of the APCS are connected over the networks.

The logical controllers control field level equipment (i.e., production lines, turbines, reactors, etc.) and other logical sub-controllers, execution modules (such as, for example, machines, industrial robots, production lines, turbines, etc.) and collects data from the sensors/gauges and provides data to the SCADA for aggregation and processing. The functionality of the logical controller is provided by an application developed by SCADA tools (or any other programmable module).

The logical controller has modules for digital and analog I/O. The controller has the interface modules for connecting to sensors/gauges and other system modules using special industrial data transmission protocols. The field level has sensors/gauges and executive modules supporting industrial data transmission protocols (such as, for example, Industrial Ethernet, Modbus, Profibus, HART, BACnet, LonWorks, EtherCAT, DeviceNet, Profinet, CANopen, Fieldbus, etc.)

Figure 1:
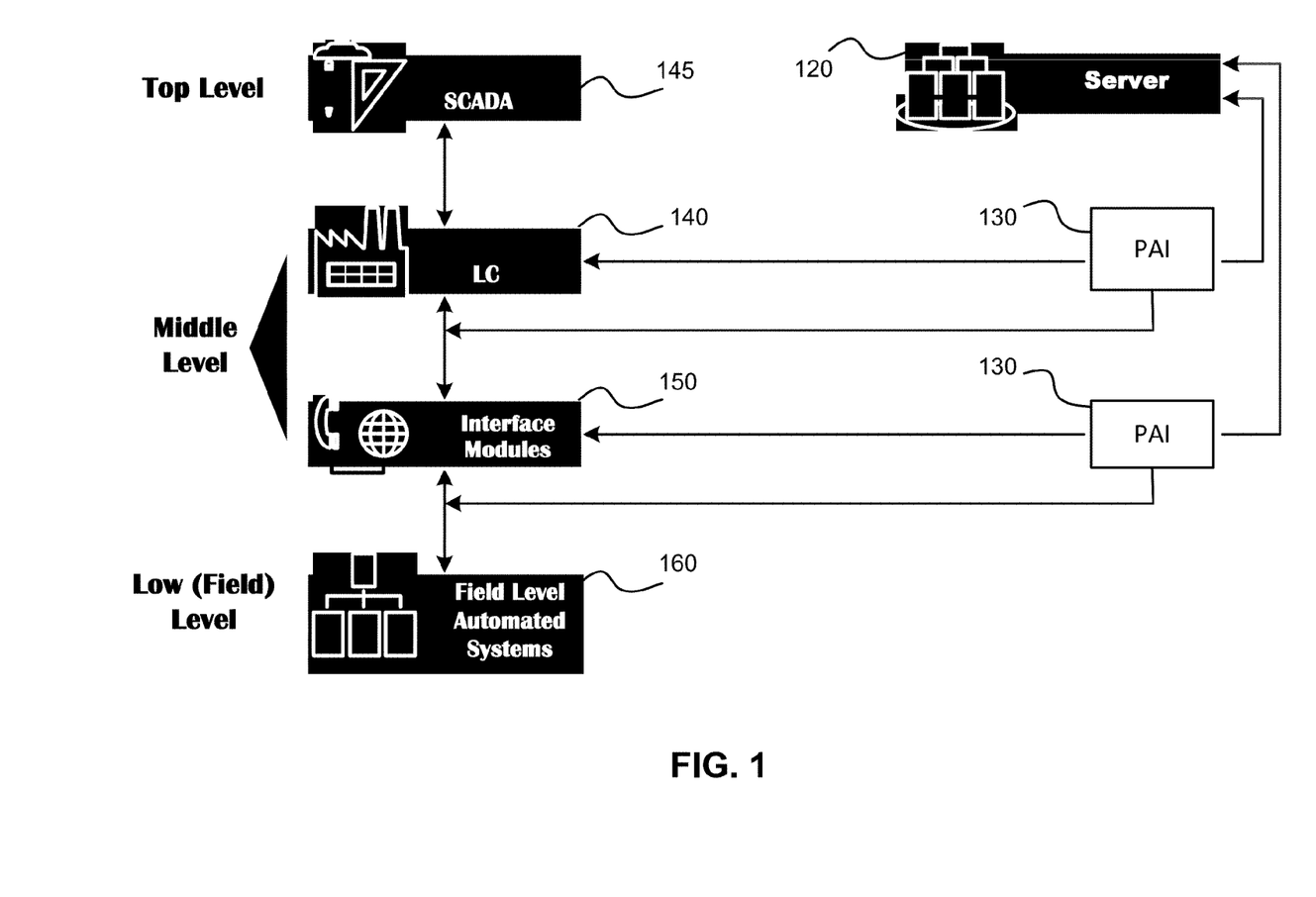
FIG. 1 illustrates a system where programmable anti-intrusion (PAI) modules are implemented, in accordance with the exemplary embodiment.

As shown in FIG. 1, programmable anti-intrusion modules (PAI) 130 are positioned between the processing server 120 and the logical controller 140 and between the processing server 120 and the APCS interface modules 150. Note that the processing server 120 is optional, and can be connected to only a portion of the PAI, or may be absent completely. In this case, the PAI has its own processing capacity, for example, using desktops, or HMI panels. The PAI 130 positioned between the processing server 120 and the logical controller 140 is connected to the logical controller 140 for controlling the incoming data stream from the control level (i.e., SCADA) 145. The data stream can be implemented using an industrial protocol. The data stream contains the control commands and data for the field level devices. The control of the data stream can be implemented by means of the industrial protocol or by hardware implementation for introducing noise into the signals depending on the implementation of the PAI module. Additional interfaces may be used to connect to the data stream, for full or partial duplication of the data being processing, or other auxiliary PAI data, for verification. The data stream can be blocked by the logical controller or by the SCADA. The logical controllers can have some special scripts for processing data. Another PAI module 130 is connected to the controller bus for controlling the out-going data stream directed to the interface modules 150. Another PAI module 130 is connected to the field-level data lines for controlling the incoming stream directed to the field level equipment 160. The data acquired by the PAI 130 modules are processed by the server 120.

According to the exemplary embodiment, if some malware is not detected by the AV modules in the SCADA system, the PAI module 130 detects an abnormality in the data incoming into the logical controller 140 and blocks it from penetrating into the field level. The malware detection can include checking for legitimacy of the sender and receiver addresses, detecting unusual or forbidden commands, controlling electrical parameters of the network and detecting the abnormalities, comparing data packets from different layers of the network, etc. Thus, the actual equipment (e.g., production lines, turbines, reactors, etc.) is not affected.

The exemplary embodiment protects the APCS against different types of threats. Some of the threats are presented by unauthorized programmable devices. These devices can be connected to the data transmission lines. The device can be any device that has an address that is not registered in the network. Typically such an intruder device is connected to the data line in parallel. Other types of threats are the authorized changes of the operational parameters made by APCS administrators by mistake. For example, mistakes in addressing the devices, changes in a network mapping or routing, mistakes in the list of forbidden commands, etc. are authorized changes made by the official operator or the administrator. Both types of threats can have a very negative impact on functionality of the APCS.

The threats can be active and passive. The passive threats do not affect the structure of the automated systems. The passive threats can steal data without falsification and distruction of the functionality of the APCS. The active threats (if executed) can potentially change the structure of the automated control systems. For example, unauthorized copying of the files is a passive threat, as well as stealing the personal data, passwords, determining the topology of the network remotely or generating a full map of the network. The passive threats affect the security of the data since the data becomes accessible by an unauthorized person.

Some of the threats intentionally change or compromise the integrity of control data used by the APCS. In some cases the threats intend to block user access to a system resource. Thus, the user cannot access some system components and the functionality of the APCS is affected if not destroyed. Thus, the programmable anti-intrusion modules (PAI) 130 are positioned throughout the APCS at all points of potential vulnerability. Note that the proposed PAI modules monitors for the middle and the field levels of the APCS.

Figure 2:
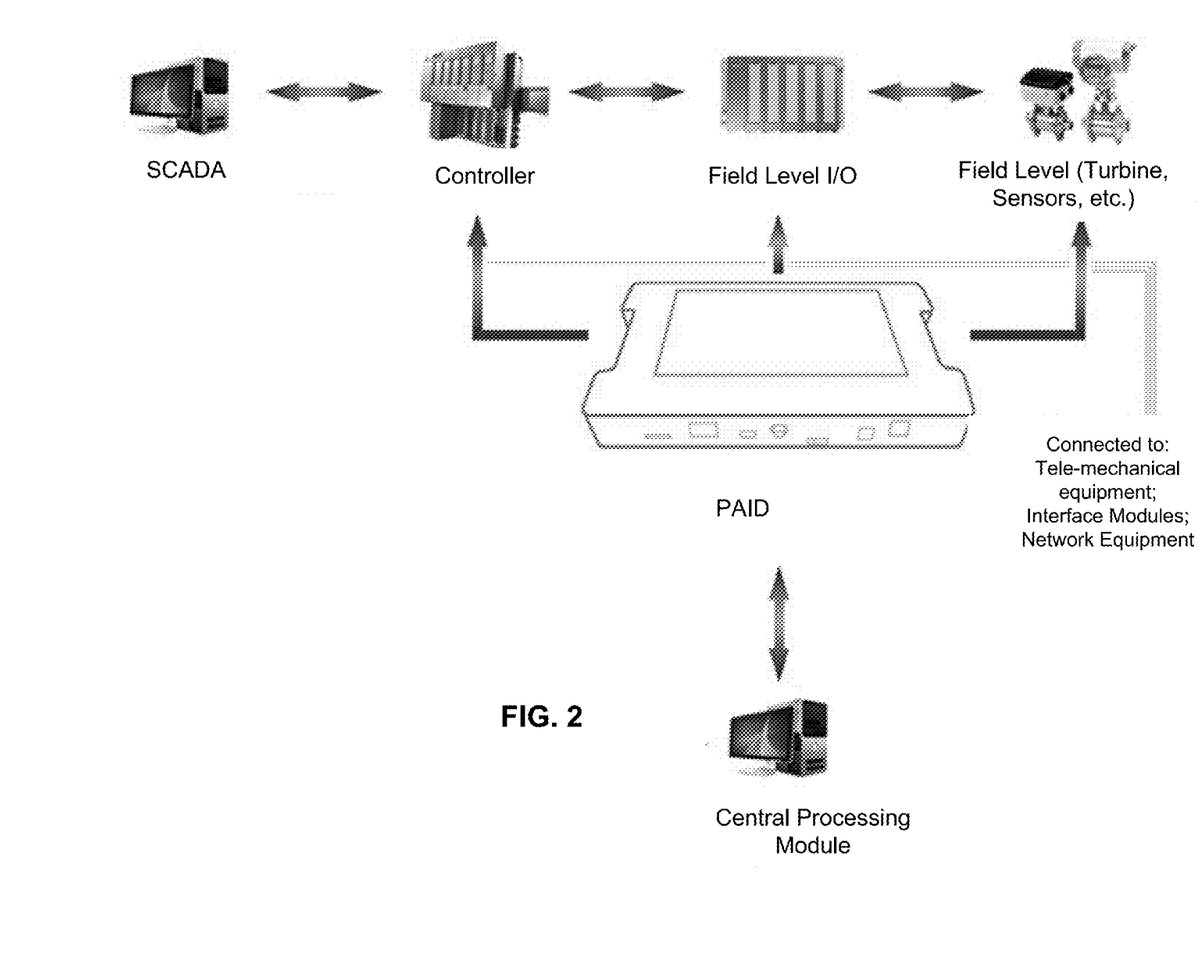
FIG. 2 illustrates general architecture of the APCS using the programmable anti-intrusion modules, in accordance with the exemplary embodiment.

A general architecture of the APCS using the programmable anti-intrusion modules is shown in FIG. 2. The SCADA provides programmable support and data acquisition for the APCS. The SCADA communicates with logical controller(s) connected to the field level I/O devices. The logical controllers control the field I/O points connected directly to the field equipment (e.g., production lines, turbines, reactors, etc.) by sending the control commands and processing the data going to the field equipment.

The programmable anti-intrusion (PAI) module controls all levels of the APCS except for SCADA—i.e., the middle level (PLC, PAC) and the field level. According to the exemplary embodiment, the PAI module exchanges the collected data with the central processing module (i.e., a server). The PAI module is implemented as a stand-alone device with (optionally) its own control panel, depending on the complexity of the entire system. The central processing module aggregates and processes data, optionally communicates with SCADA (depending on the complexity of the entire system and the underlying technological process at issue) and with APCS operators. Generally, the decision of whether to exchange data directly, between SCADA and one or more PAI modules, or through a CPU, depends on the architecture of the system.

A logical controller level communicates with the field level, typically, using real-time data exchange protocols, the protocols with strict rules for separating data sending time intervals, the data transmission protocols with high capacity (e.g., Profibus, RTP, RTSP). The devices are synchronized and are given some time intervals in order of milliseconds. The SCADA communicates with the logical controller in a less precise manner—the time intervals are on the order of seconds. The logical controller receives the entire logic of the technological process from the SCADA level. The logic includes all the steps of the technological process implemented at the field level. The SCADA level sends the control commands to the controller as well.

The process logic is defined by the commands sent form the controller to the field level where the commands control the actual physical equipment. According to the exemplary embodiment, the commands are analyzed by the PAI module attached to the logical controller prior to sending the commands to the field level equipment. The commands and data can be analyzed. The PAI module can check if the command is authorized and has a correct format (i.e., is not destructive).

The PAI module also checks the addresses of the sending and the receiving devices. The PAI module can detect undocumented (unregistered) devices connected to the data transmission lines. The data is checked in terms of falsification, unauthorized updates or possible blocking of the users or devices. The PAI module can detect commands that are not allowed and check for all registered devices. Additionally, the PAI module can check the data against the templates containing expected behavior patterns, as well as based on expert assessment model and state graphs that were previously loaded into the PAI logic. Optionally, there is a possibility of interaction between the PAI and a single point of data processing (e.g., a server), or with SCADA directly, in order to determine the legitimacy of the data transmission in real time (this is usually applicable to more complex technological processes being controlled and/or to more complex APCS architectures). The pattern templates of the equipment behavior are created at the self-teaching stage of the system. The behavior templates contain data produced during the self-teaching phase.

The logical controller supports scripts implemented using IEC 61131-3 languages. The PAI module can be connected to the controller as an interface module or as a communication processor. The controller has the scripts that duplicate the data that needs to be processed by the PAI module. The controller script can collect data from different sources (the controller, the interface modules, etc.) and send the data to the processing module. The PAI module analyzes the data and sends the response back to the logical controller.

Alternatively, the PAI module can be implemented as a network screen. In this case, the interface cables of the data lines are connected directly to the PAI module. The data is received by the controller and immediately analyzed by the PAI module. The PAI makes a decision as for sending the data along to the field level devices. According to the exemplary embodiment, the PAI module is a hardware-based device, which uses unique algorithms for analyzing the APCS protocols for detecting intrusions and unauthorized access or other unauthorized actions. The PAI module implements behavior analysis (including the teaching aspects for future reference).

The PAI module checks the commands against a database of authorized and unauthorized commands. The PAI module can check electrical parameters and detect hidden data leaks. Additionally, the PAI module can compare data received from different levels of the APCS. The PAI module can protect data exchange protocols by implementing the encryption of the data.

The PAI module can exchange data with the central processing module, which can be connected to SCADA. Thus, data can be aggregated from several PAI modules and analyzed by the central processing module.

According to the exemplary embodiment, the APCS is, advantageously, protected at the middle level (automation equipment) and the filed (executive equipment) levels. Additionally, the data channels and hardware devices of the APCS are protected throughout the entire system from SCADA down to the field level. If some malware is not detected at SCADA level, it is detected and blocked at the lower levels of the APCS. The unauthorized connections to the communication lines are also detected.

Note that all of the conventional protection systems used in the APCS always address only the SCADA level. The proposed architecture addresses the APCS security at the middle and the field level as well. According to the exemplary embodiment, the data transmitted between system components of the APCS is protected from being falsified. In order to protect data, a special set of symbols can be added to check for data integrity and to authenticate the data source. The set of symbols contains the data known only to the sender and to the receiver. Alternatively, the data can be encrypted by the PAI module that encrypts only part of the network traffic. Thus, a remote user of the APCS can exchange data with other network resources without additional encryption. The PAI module also can protects APCS from unauthorized access by allocating only certain time periods for reading and writing data. The arbitrary time periods can be allocated depending on the needs of the APCS (e.g., from seconds to minutes and hours).

According to the exemplary embodiment, the PAI module prevents unauthorized use of the data channels. The protection system analyzes the data channel and detects unauthorized data transmissions that use a protocol packets different from a protocol packets of a given system. For example, if a structure of transmitted packets differs from a structure used in a given APCS, the packets are intercepted.

The PAI module continuously monitors the data channel, and as soon as a command appears online, the system checks if a device with a declared address has actually sent this command through the network. The device address can be checked using a heuristic template, using packet data received from a different level of the network, or by using the metadata (for example, comparing MAC and IP address). The modular structure of the intrusion detection system comprising several PAI modules allows for efficient reconfiguration in order to analyze a new protocol. According to the exemplary embodiment, one PAI module can control the transmitted data at several connection points of the system. The PAI module can be connected to the equipment or to the transmission lines using different protocols.

Figure 3:
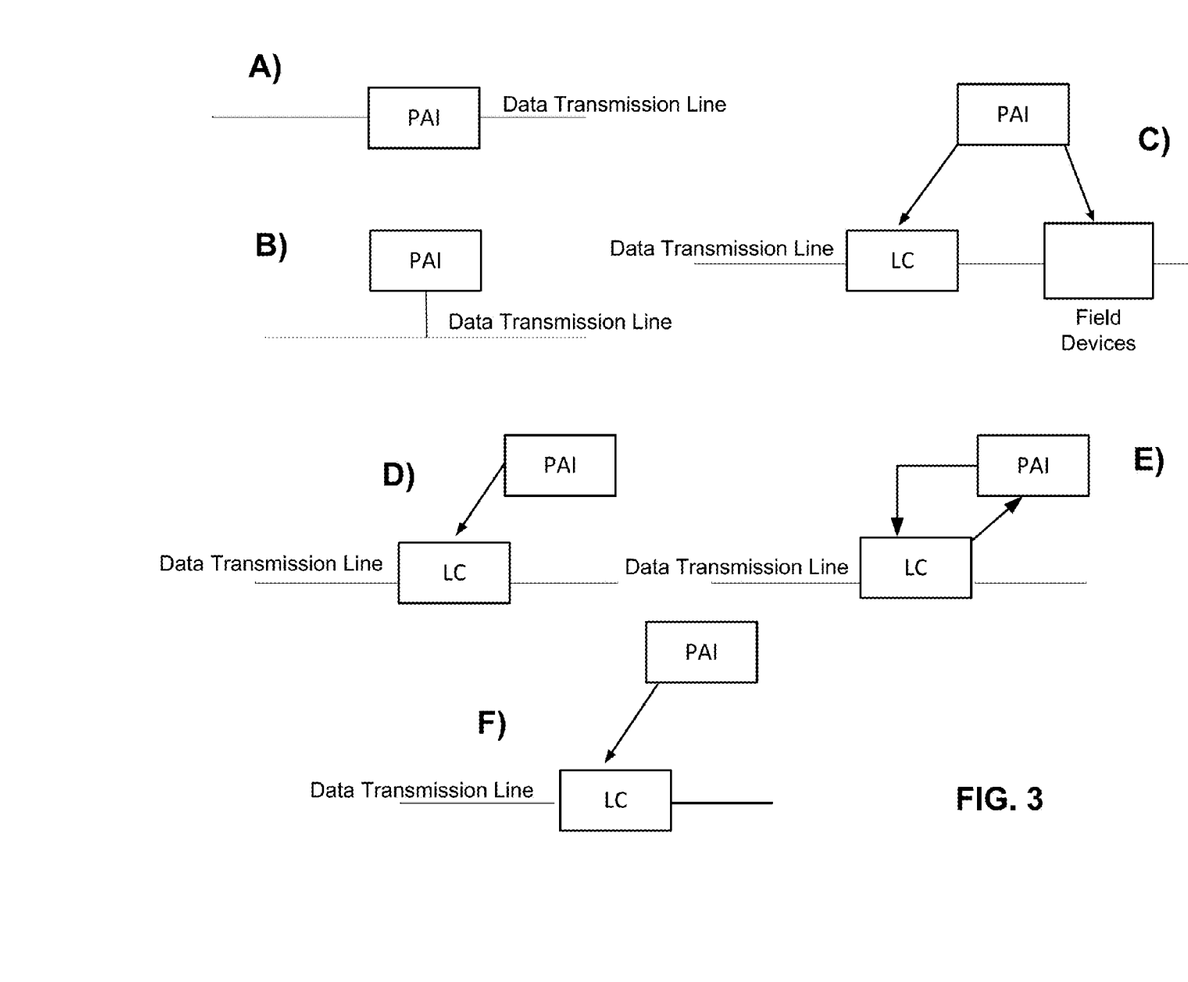
FIG. 3 illustrates examples of connecting the PAI modules within the APCS.

According to one embodiment, the PAI module can be implemented as a portable device, as a server based system or as a stationary system based on a personal computer. The PAI module can be also implemented as a portable device with processor based on ARM architecture. The intrusion detection system is shown in FIG. 2. The PIA devices can be connected to any of the potential vulnerability point of the APCS at the levels below SCADA. As shown in FIG. 3, the PAI modules can be placed on the data transmission line (see example A) or it can be connected to a certain point of the data transmission line (example B). The PAI module can be placed between the logical controller and the additional device (example C, for example, a bus management device). In this arrangement, the PAI module analyzes the commands and data coming out of the logical controller and makes a decision whether to send the commands or data to the field level equipment.

The PAI module can be connected to the logical controller for exchanging data (as shown in example D). The controller has connectors that are used for connecting to the PAI module. The PAI module can be also connected to the logical controller (example E) where the PAI module receives data from the logical controller and returns permission to pass the data to the field level over the transmission line.

According to the exemplary embodiment, the PAI module can be connected using any of the above examples depending on the infrastructure of the APCS. The PAI module can be connected to the field level devices using external interfaces of these devices in order to control the integrity of the data sent from the logical controller to a particular device. The data exchange with the central processing module (see FIG. 2) can be implemented over existing data transmission lines, using a satellite channel, over protected cellular lines, etc. Thus, the system includes two or more PAI modules connected to vital points of the APCS infrastructure.

The PAI modules provide data to the central processing module (i.e., a server) for processing data and detecting instances of data falsification, data modification, blocking, injection of unauthorized data or commands, etc. In other words, all possible types of threats are detected and prevented from penetration to the filed level where the actual harm can be done to the automated systems (e.g., production lines, turbines, reactors, etc.).

Those skilled in the art will appreciate that the proposed embodiment provides a complex protection of different nodes of the APCS infrastructure all the way from the SCADA level to the field level. The PAI modules can be connected to the logical controllers and control data and commands going through the controllers. All data (or partial data) going through the logical controller can be duplicated on the PAI module for checking the data for possible threats. The PAI module has functionality for blocking data transmission from the logical controller. The current data transmission can be blocked or any subsequent data transmission through the given controller can be stopped as well.

The data from the logical controller can be first sent to the PAI module and only after the PAI module checks the data and returns it back to the logical controller, the controller sends the data through the data transmission line, as shown in the example E (see FIG. 3). Note that the conventional systems do not have any protection devices attached to the logical controllers. Generally, no protection below the SCADA level is available in automated control systems.

Figure 4:
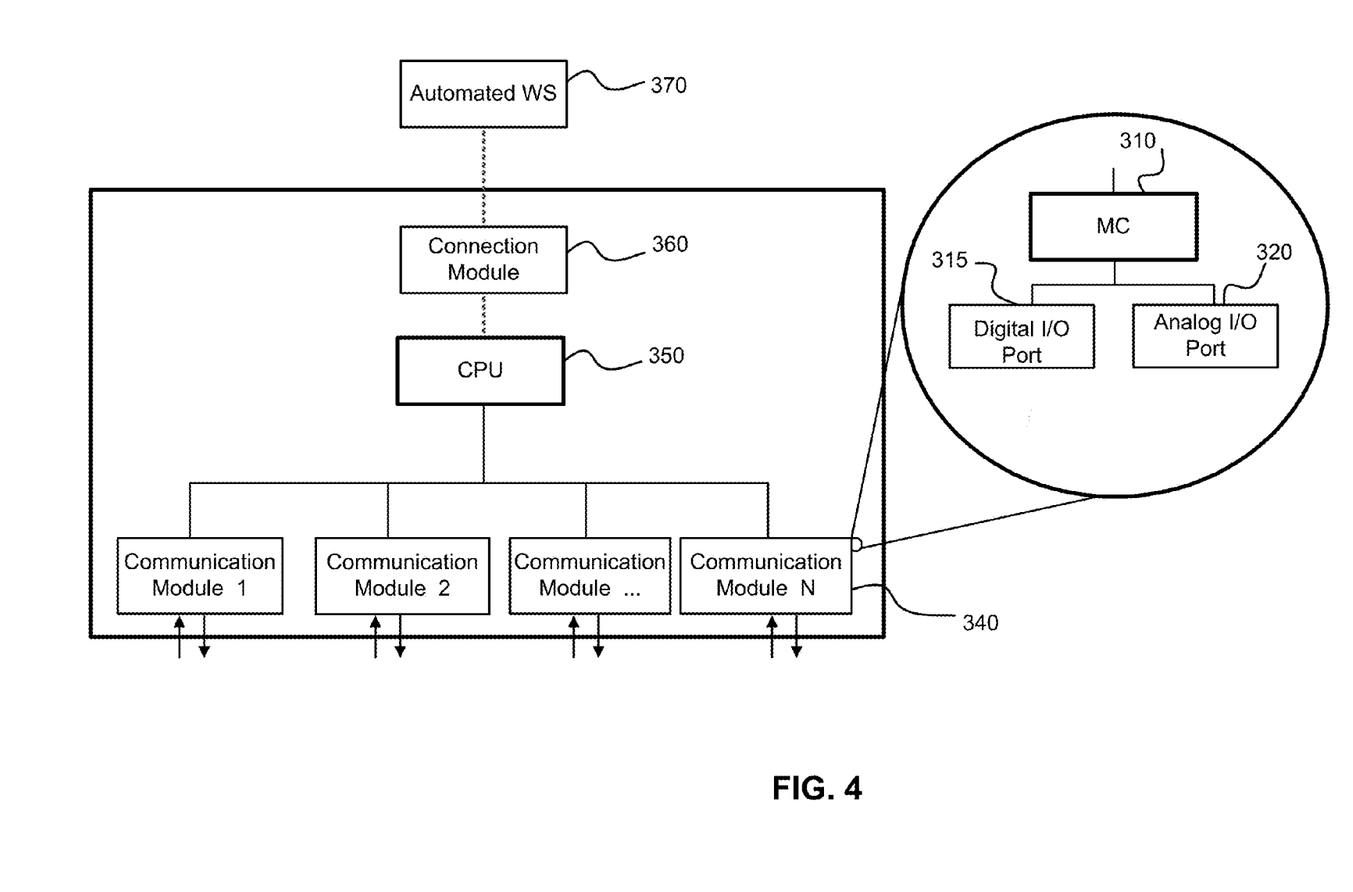
FIG. 4 illustrates PAI module architecture, in accordance with the exemplary embodiment.

FIG. 4 illustrates PAI module architecture, in accordance with the exemplary embodiment. The PAI module has a connection module 360 connected to the automated operator workstation 370. The automated operator workstation 370 performs security monitoring based on the data received from the CPU 350 via a connection module 360. This module can use either wired or wireless communications. The CPU 350 analyzes the signals received from communication modules 340. The CPU 350 detects illegal commands and informs the automated operator workstation 370 about a potential threat. The CPU 350 also can generate control commands and sends them to the data transmission line via the communication modules 340.

The CPU 350 can be implemented as a microprocessor based on the well known ARM architecture. Alternatively, the CPU can be implemented as computing devices based on the x86 architecture or a microcontroller or a programmable logic device (PLD). The CPU 350 can include communication modules 340 for Wi-Fi/Bluetooth, etc. The communication module 340 includes a microcontroller 310 or the PLD having analog 320 and digital 310 I/O ports.

Each communication module 340 can send and receive data and can have several connectors for connecting to the data transmission lines based on a particular communication protocol. The microcontroller 310 converts the received data into a common format for further processing by the CPU 350. The microcontroller 310 also converts the commands received from the CPU 350 into the required protocol. Each communication module 340 can communicate using a particular protocol or by modulation of hardware signals outside the protocol. The communication module 340 can use native signal modulation of the hardware devices or other modulations when hidden high frequency modulations are inserted by the intruder into a regular protocol.

The hidden modulation is a signal that does not correspond to the physical characteristics of the device described in the protocol. The intruder can use the hidden modulation for sending data between the two devices. The hidden modulation can be used for stealing the data using existing communication channels. The PAI modules connected to the data transmission lines detect the hidden modulations. The PAI module can have its own I/O modules (e.g., a keyboard-based interface, a touch panel, a touch screen, etc.).

Figure 5:
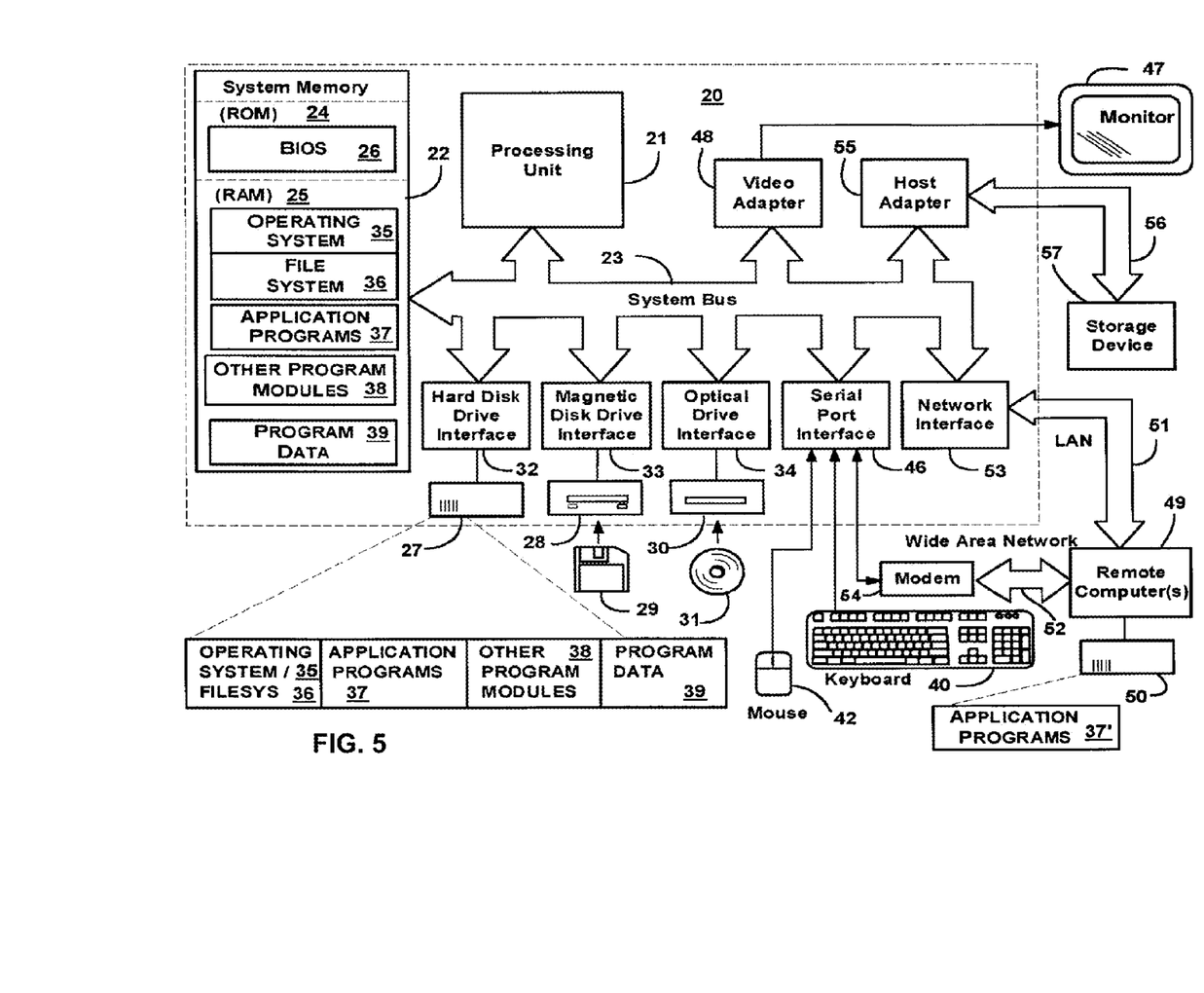
FIG. 5 illustrates a schematic diagram of an exemplary computer or server that can be used in the invention.

With reference to FIG. 5, an exemplary system for implementing the invention includes a general purpose computing device (i.e., a host node) in the form of a personal computer (or a node) 120 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer/server 120, such as during start-up, is stored in ROM 24. The personal computer/server 120 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™). The computer 120 includes a file system 36 associated with or included within the operating system 35, such as the WINDOWS NT™ File System (NTFS), one or more application programs 37, other program modules 38 and program data 39. A user may enter commands and information into the personal computer 120 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer/server 120 may operate in a networked environment using logical connections to one or more remote computers 49. The remote computer (or computers) 49 may be another personal computer, a server, a router, a network PC, a peer device or other common network node, and typically includes many or all of the elements described above relative to the computer 120.

The computer 120 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 120 is connected to the local area network 51 through a network interface or adapter 53.

When used in a WAN networking environment, the personal computer 120 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 120, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A system for protection of an automated process control system (APCS), the system comprising:
    at least one logical controller connected to a supervisory control and data acquisition (SCADA) module for receiving commands and data sent from the SCADA module through a data transmission line;
    at least one programmable anti-intrusion module (PAI) connected to the data line below the (SCADA) module; and
    a server for processing data provided by the PAI module, wherein:
        the PAI module collects data from the data line and intercepts commands from the logical controller and provides the data to the server;
        the PAI module makes a decision whether to allow the logical controller to send the data and the command to a plurality of field level automated modules; and
        the server aggregates and analyzes data received from the PAI module.

2. The system of claim 1, further comprising a plurality of logical controllers connected to data transmission lines.

3. The system of claim 2, wherein a plurality of PAI modules are connected to the logical controllers throughout the APCS below a SCADA level.

4. The system of claim 1, wherein the PAI module use any of:
    a parallel connection to the data transmission line;
    a serial connection to the data transmission line;
    a parallel connection to the logical controller;
    a serial connection to the logical controller; and
    a connection to at least two data transmission lines.

5. The system of claim 1, wherein the field level automated modules comprising any of:
    an automated production line;
    tele-mechanical equipment;
    a power system protection;
    an actuator; and
    a device sensor.

6. The system of claim 1, wherein the PAI module checks a source of the commands addressed to a particular device.

7. The system of claim 1, wherein the PAI module checks electrical signals for hidden modulations.

8. The system of claim 1, wherein the PAI module collects heuristic data of the logical controller.

9. The system of claim 1, wherein the PAI module checks for presence of all declared devices of the APCS.

10. The system of claim 1, wherein the server processes the data provided by the PAI module and detects any of:
    data falsification;
    data modification;
    insertions of data into the data transmission lines;
    forbidden commands; and
    blocking of data.

11. The system of claim 1, wherein the PAI duplicates the data received by the logical controller and determines detects whether the data can be sent to the field level modules.

12. The system of claim 1, wherein the PAI module comprises a microprocessor with a digital and an analog I/O ports.

13. A method for protection of an automated process control system (APCS), the method comprising:
    connecting at least one programmable anti-intrusion module (PAI) to a data transmission line of the APCS below a supervisory control and data acquisition (SCADA) module level;
    analyzing the APCS for presence of unauthorized devices and un-authorized connections;
    detecting undocumented devices connected to the APCS;
    identifying suspicious commands from connected devices;
    analyzing the data transmission lines for unauthorized data transmissions;
    providing device activity data to a server; and
    analyzing the device activity and detecting suspicious behavior patterns.

14. The method of claim 13, further comprising encryption of the APCS data going through the data transmission line.

15. The method of claim 13, wherein the PAI module is connected to a logical controller.

16. The method of claim 15, wherein the PAI module duplicates data received by the logical controller and makes a decision whether to allow the data to be sent to a plurality of field level devices.

* * * * *